Figure 3:
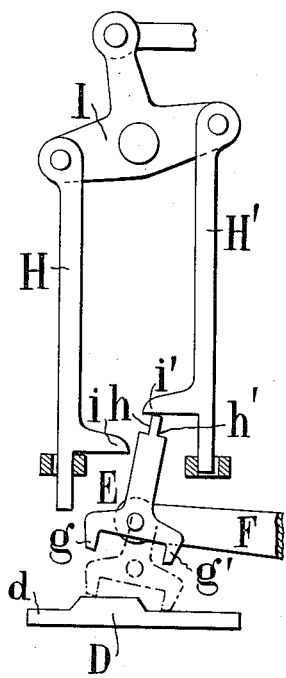

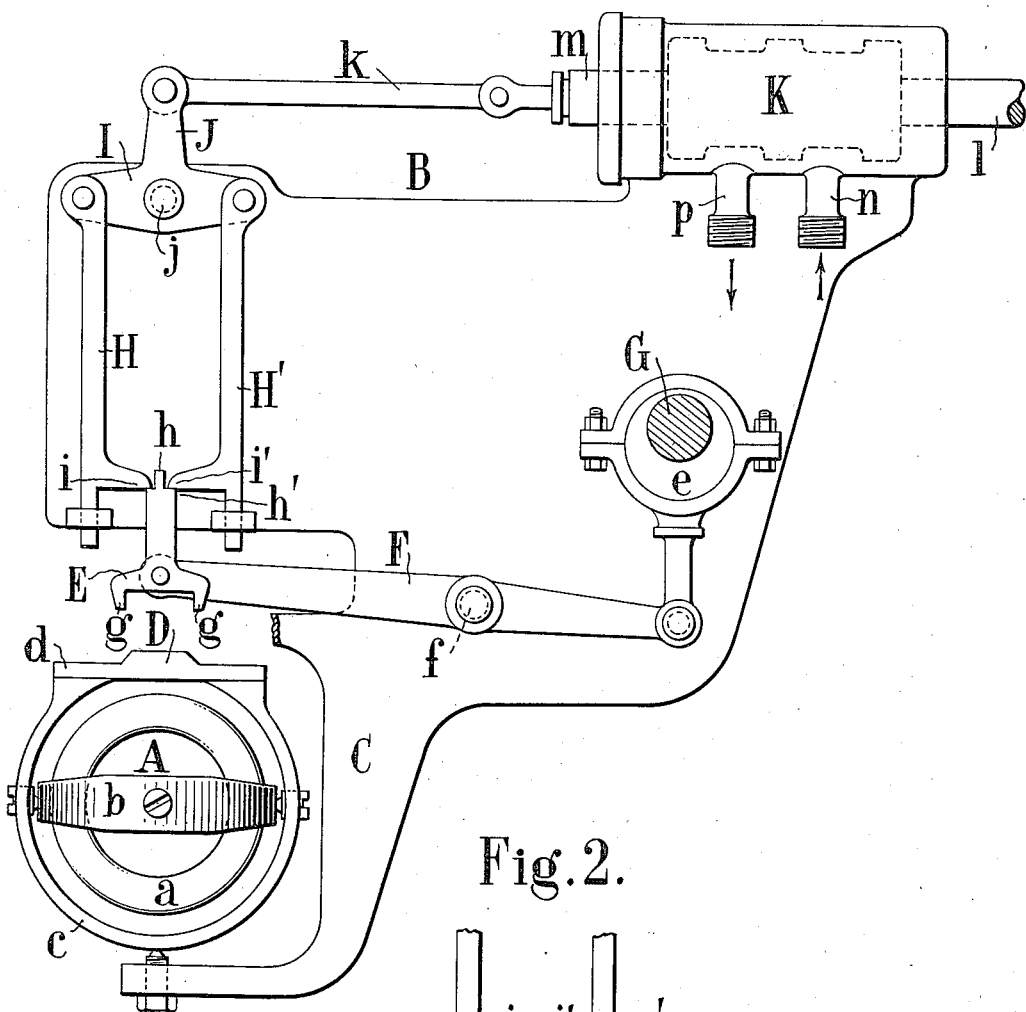
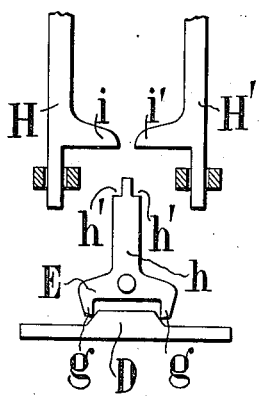

F. M. LEAVITT.
CONTROL MECHANISM FOR STEERING APPARATUS.
APPLICATION FILED MAR. 20, 1907.

901,355.

Patented Oct. 20, 1908.

3 SHEETS—SHEET 2.

WITNESSES:
Fred White
René Ruine

INVENTOR
Frank M. Leavitt,
By Attorneys,

F. M. LEAVITT.
CONTROL MECHANISM FOR STEERING APPARATUS.
APPLICATION FILED MAR. 20, 1907.

901,355.

Patented Oct. 20, 1908.

3 SHEETS—SHEET 3.

WITNESSES:
Fred White
René Bruine

INVENTOR:
Frank M. Leavitt
By Attorneys,

UNITED STATES PATENT OFFICE.

FRANK M. LEAVITT, OF NEW YORK, N. Y., ASSIGNOR TO E. W. BLISS COMPANY, OF BROOKLYN, NEW YORK, A CORPORATION OF WEST VIRGINIA.

CONTROL MECHANISM FOR STEERING APPARATUS.

No. 901,355.     Specification of Letters Patent.     Patented Oct. 20, 1908.

Application filed March 20, 1907. Serial No. 363,394.

*To all whom it may concern:*

Be it known that I, FRANK M. LEAVITT, a citizen of the United States, residing in the borough of Manhattan, county of Kings, city and State of New York, have invented certain new and useful Improvements in Control Mechanisms for Steering Apparatus, &c., of which the following is a specification.

This invention provides an improvement in mechanism by which a power-driven apparatus may be controlled by an independent movable element acting as a pilot or director.

In my United States Patent No. 795,045, dated July 18, 1905 is set forth a mechanism by which a steering apparatus or other power driven mechanism may be controlled by a gyroscope or other sensitive element through the medium of a rapidly reciprocating "feeler" which, in one movement lightly touches the gyroscope and receives a position therefrom, and in its opposite movement acts, according to its position, to communicate movement to the controlled mechanism. This means for transferring control has the important advantage that the feeler acts so gently or delicately upon the controlling element as not to perceptibly disturb it, while it affords a means of exerting practically unlimited power from an independent source to move the controlled apparatus. The mechanism of that patent has been successfully applied to gyroscopically-controlled steering apparatus used in automobile torpedoes. As set forth in said patent, the mechanism is adapted to displace the controlled apparatus from one extreme position to the opposite one; so that as a steering apparatus it would throw the rudder from hard-a-port to hard-a-starboard, or vice versa, but without any provision for moving the rudder to its intermediate or amidships position.

The purpose of the present invention is to provide a mechanism of this character which shall be capable of imparting to the controlled apparatus either an extreme movement to either side or a movement to an intermediate or mid-position.

The invention is chiefly valuable as applied to steering apparatus but may also find utility in other analogous applications. It is not limited in its application to gyroscopically controlled apparatus but is useful wherever the controlling element is of sensitive character so that it is desirable to shield it from disturbances incident to its transfer of control to the controlled apparatus.

Figure 4:
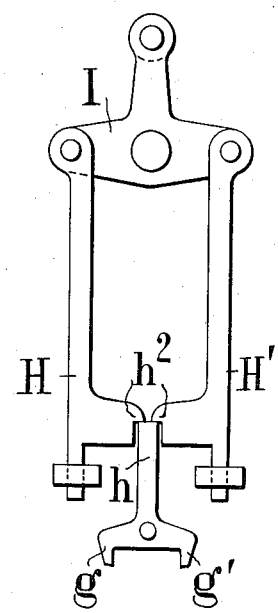
Figure 5:
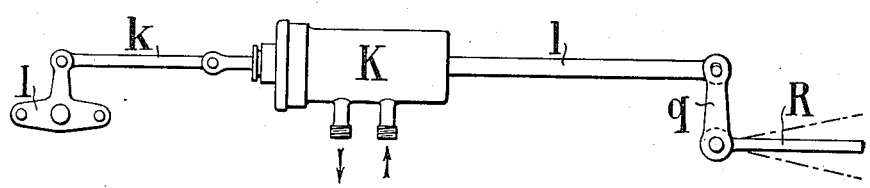
Figure 6:
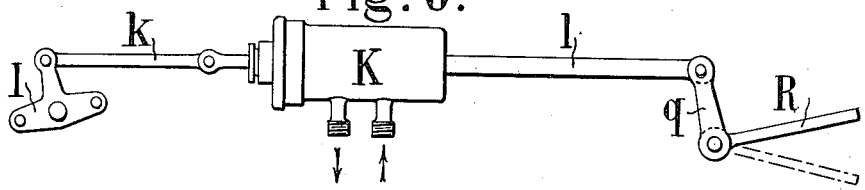
Figure 7:
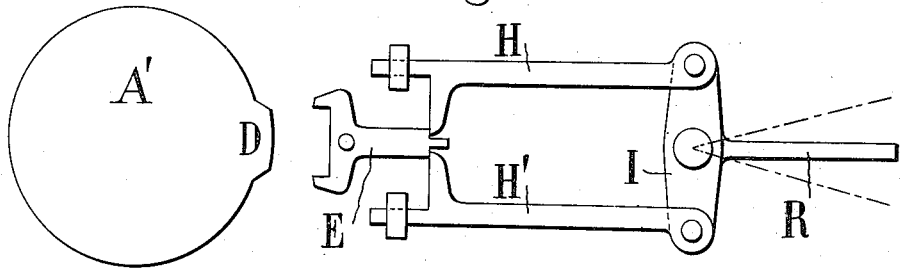
Figure 8:
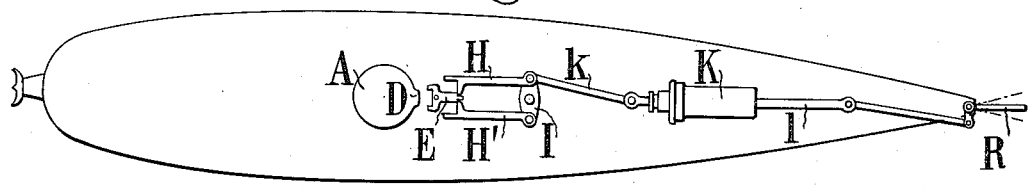
Figure 9:
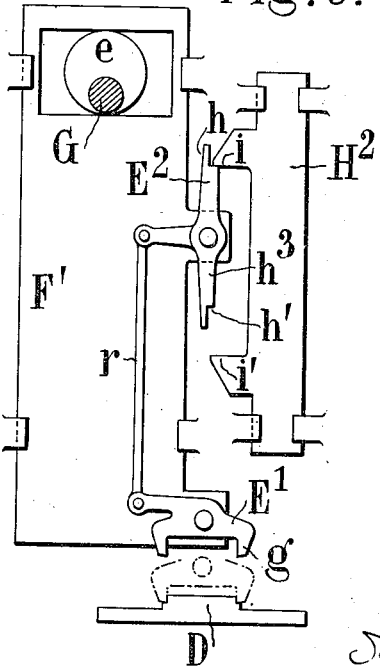

Figure 1 of the accompanying drawings is an elevation showing one suitable embodiment of this invention. The view corresponds to Fig. 2 of said Patent No. 795,045; Fig. 2 is a fragmentary view showing certain of the parts of Fig. 1 in a different position; Fig. 3 is a similar view showing the parts in another position; Fig. 4 is a fragmentary view showing a modification; Figs. 5 and 6 are diagrammatic views showing the application of the invention to a steering apparatus; Fig. 7 is a plan showing a modified application to a steering apparatus; Fig. 8 is a diagram showing one mode of applying the invention to the gyroscopic steering of automobile torpedoes. Fig. 9 is a diagrammatic view illustrating a modified construction.

Referring to Fig. 1 of the drawings, let A designate the gyroscope or other sensitive controlling element or pilot; and let B designate as a whole any mechanism or apparatus to be controlled by the part A. The gyroscope comprises as usual a fly-wheel $a$, an inner ring $b$ and an outer ring $c$, the latter hung in any suitable frame or support C. The ring $c$ carries a plate $d$ having a suitable projection or cam D. Adjacent to this is the light feeler or dog E which is mounted upon any suitable carrier so as to be caused to reciprocate rapidly toward and from the cam. The carrier may be any suitable moving part, being shown as one arm of a lever F fulcrumed at $f$ and connected to an eccentric $e$ on a revolving shaft G which is driven at the requisite speed from any suitable source of power.

The feeler may be variously formed, being essentially a light piece of suitably strong material adapted when moved into contact with the cam to be set or turned thereby to a position corresponding with the position of the cam (as determined by the gyroscope) and adapted when moved away therefrom to act forcibly against some part of the mechanism or apparatus which is to be controlled. The feeler is shown as a three armed piece or dog pivoted to the carrier F, having two lower arms or toes $g$, $g$ for engaging the cam and an upper arm $h$ for engaging the controlled mechanism.

The controlled mechanism is shown as comprising two tappets H and H', which are shown as rods pivoted at their upper ends to the opposite arms of a lever I which is fulcrumed at $j$. From this lever motion can be taken to operate any desired apparatus. For example, the lever I is shown with an upper arm J connected by a rod $k$ to the valve of a fluid pressure engine K which in turn through a piston rod $l$ may operate any other apparatus.

So far as described the mechanism does not differ from that set forth in my said Patent No. 795,045. According to the present invention the feeler E may engage each of the movable parts H, H' at two points instead of only one. For this purpose the arm $h$ of the feeler may have supplemental shoulders $h'$, $h'$, Fig. 2, which, when the feeler rises in its middle position as shown in Fig. 1, encounters the shoulders $i$, $i'$ on the parts H, H' and brings them both to the same level, as shown in Fig. 1. Or the supplemental shoulders may be formed on the parts H, H' as shown at $h^2$ in Fig. 4. In either case the result is the same, that when the feeler is in its mid-position, the parts H, H' are moved to intermediate positions, the lever I is not tilted, and in case of an engine K its valve is brought to mid-position. When, however, the cam D is displaced to either side, the feeler is tilted as shown in Fig. 3, and in rising the end of the arm $h$ strikes one of the shoulders $i$, $i'$ and consequently pushes up the part H or H' on that side and tilts the lever I, as shown in Fig. 3. When the cam D moves back to its normal or central position, the feeler is restored to its mid-position as shown in Fig. 2 and upon its next upward movement, the end of its arm $h$ passes between the projections $i$, $i'$ and its shoulders $h'$ to bring these projections to a level as shown in Fig. 1, thereby restoring the parts to their normal or mid-positions.

For operating the rudder, the rod $k$ might connect directly with the tiller; but the preferred and more usual arrangement is to employ a steering engine K of that type wherein the valve works within a piston or plunger, being what is known in the art as a "floating valve." It is characteristic of such an engine that any movement of its valve stem and valve is followed by a corresponding movement of its piston or plunger. Such steering engines are well known and it is needless to show the same in detail. In Fig. 1 is shown at K the exterior of a steering engine of this type as used in the Whitehead torpedo. The valve rod enters within a neck $m$ of the hollow plunger (shown in dotted lines) which forms the valve chest, the opposite end of which is connected to the rod $l$; fluid under pressure enters at $n$ and exhausts at $p$. As the movements of the lever I are communicated through the valve rod $k$ to the valve, the plunger follows these movements and correspondingly moves the rod $l$ which, as shown in Fig. 5, is connected to the tiller $q$ of the rudder R. The parts are shown in a mid-position in Fig. 5 and in a displaced position in Fig. 6.

A simplified example of steering apparatus is shown in Fig. 7, where the lever I forms itself the tiller, being fixed to the rudder post over the rudder R. The feeler here is shown as reciprocating horizontally instead of vertically. The part A' may in this figure represent a gyroscope or any other controlling element, such for example, as a magnetic compass, being formed with the cam D on one side.

Fig. 8 is a diagram showing one means by which the present invention may be utilized for steering a torpedo in either a horizontal or vertical plane. For steering in a horizontal plane the part A may be a gyroscope; for steering in a vertical plane it may be any cam disk oscillated or controlled by a pendulum, hydrostatic diaphragm or other means known in the art suitable for controlling an immersion mechanism. The reciprocating feeler acts in the manner already described upon the parts H, H' and lever I, one arm of the latter being connected to the valve rod $k$ of the steering engine K, and the plunger rod $l$ of the latter being connected to the tiller.

Fig. 9 shows a modification in which the feeler is divided into two parts, the lower portion E' having toes $g$ for touching the cam D, and the upper portion $E^2$ formed with an upwardly projecting arm $h$ and a downwardly projecting counterpart thereof $h^3$. The feeler E' is connected to the upper part $E^2$ through a rod $r$. Both are pivoted on a slide F' which forms the vertical or reciprocating carrier and which, as in the first described construction, is reciprocated from a power-driven shaft G through an eccentric $e$ or the like. Instead of the two parts H, H', a single part $H^2$ is shown, which is mounted as a slide and carries opposite shoulders $i$, $i'$. The arms $h$, $h^3$ have shoulders $h'$ which have the same function as in the first described construction. The operation does not differ in any essential respect from that of the construction first described; that is to say, so long as the cam D is central the feeler occupies a symmetrical mid-position and its shoulders $h'$ act against the shoulders $i$, $i'$ to keep the slide $H^2$ in mid-position. But upon a displacement of the cam and tilting of the feeler, the end of the corresponding arm $h$ or $h^3$ acts against the corresponding shoulder $i$ or $i'$ to displace the slide in a corresponding direction. The cam D may be greatly varied. It is shown in Fig. 9 as a stepped cam.

My invention may be modified in its mechanical details in various respects according to the specific purpose for which it is to be used, and in order to adapt it to the other parts or mechanisms with which it is to coöperate.

I claim as my invention:—

1. The combination with a controlling or pilot part, and a controlled part or mechanism, of a feeler and power-driven means for reciprocating it rapidly toward and from the pilot part, said feeler adapted on touching said part to be positioned thereby, and on receding therefrom to communicate movement according to its position to said controlled part, the latter and the feeler having relatively-arranged shoulders adapted in the middle position of the feeler to bring the controlled part to mid-position, and in either deflected position of the feeler to displace the controlled part in the corresponding direction.

2. The combination with a controlling or pilot part, and a controlled mechanism, of a feeler and power-driven means for reciprocating it rapidly toward and from the pilot part, said feeler adapted on touching said part to be positioned thereby, and on receding therefrom to communicate movement according to its position to said controlled mechanism, the latter comprising oppositely-acting tappets, and the tappets and feeler having coacting shoulders relatively arranged to engage in the middle position of the feeler to bring the tappets to mid-position, and in either deflected position of the feeler to displace the tappets in opposite directions.

3. The combination with a controlling or pilot part, and a controlled mechanism, of a feeler and power-driven means for reciprocating it rapidly toward and from the pilot part, said feeler adapted on touching said part to be positioned thereby, and on receding therefrom to communicate movement according to its position to said controlled mechanism, the latter comprising tappet rods and a lever connecting them, the tappet rods and feeler having coacting shoulders relatively arranged to engage in the middle position of the feeler to bring the tappets to mid-position, and in either deflected position of the feeler to displace the tappets in opposite directions.

4. The combination with a controlling or pilot part, and a controlled mechanism, of a feeler and power-driven means for reciprocating it rapidly toward and from the pilot part, said feeler adapted on touching said part to be positioned thereby, and on receding therefrom to communicate movement according to its position to said controlled mechanism, the latter comprising oppositely-acting tappets, and the tappets and feeler having coacting shoulders which are single on the one part and double on the other, relatively arranged to adapt the feeler in its middle position to engage both tappets and bring them to mid-position, and in either deflected position of the feeler to engage the corresponding tappet by a different shoulder to displace the tappets from the mid-position.

5. The combination to form a steering apparatus of a controlling or pilot part, a controlled part, a feeler, and power-driven means for reciprocating it rapidly toward and from the pilot part, said feeler adapted on touching said part to be positioned thereby, and on receding therefrom to communicate movement according to its position to said controlled part, the latter and the feeler having relatively arranged shoulders adapted in the middle position of the feeler to bring the controlled part to mid-position, and in either deflected position of the feeler to displace the controlled part in the corresponding direction, and an operative connection between said controlled part and the rudder.

In witness whereof, I have hereunto signed my name in the presence of two subscribing witnesses.

FRANK M. LEAVITT.

Witnesses:
H. F. HUGHES,
ARTHUR C. FRASER.